Jan. 27, 1931.  H. C. SILENT  1,790,079
SYSTEM FOR MEASURING DELAYED CURRENT EFFECTS
Filed Feb. 20, 1929

INVENTOR
H. C. Silent
BY
ATTORNEY

Patented Jan. 27, 1931

1,790,079

UNITED STATES PATENT OFFICE

HAROLD C. SILENT, OF LOS ANGELES, CALIFORNIA, ASSIGNOR TO AMERICAN TELEPHONE AND TELEGRAPH COMPANY, A CORPORATION OF NEW YORK

SYSTEM FOR MEASURING DELAYED-CURRENT EFFECTS

Application filed February 20, 1929. Serial No. 341,520.

An object of my invention is to provide a new and improved method and corresponding apparatus for measuring echo currents and other delayed current effects. Another object of my invention is to provide for determining the varying amplitude of an echo current or other delayed current throughout the essential time period in which it occurs. Another object of my invention is to provide for measuring such a current effect after the lapse of a definite period of time. These objects and various objects of my invention will become apparent on consideration of a limited number of examples of practice according to the invention, which I have chosen for presentation in the following specification. It will be understood that this specification relates principally to these examples of the invention and that the scope of the invention will be indicated in the appended claims.

Figure 1:
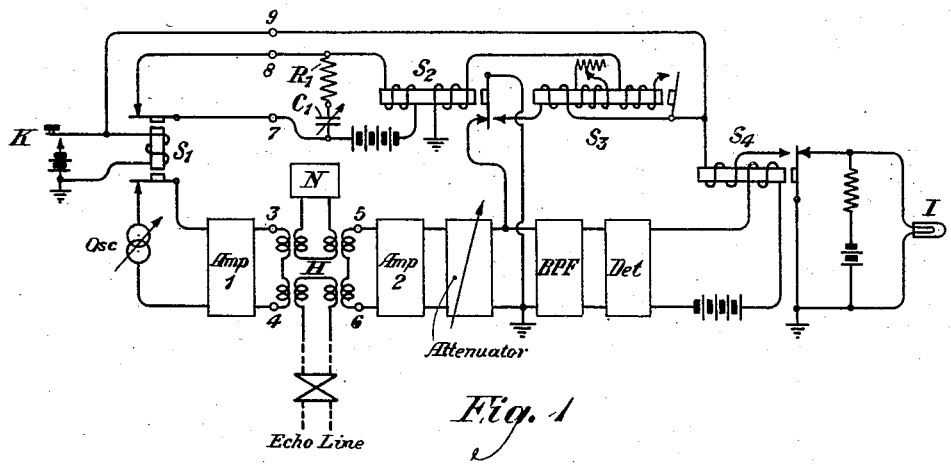
Figure 2:
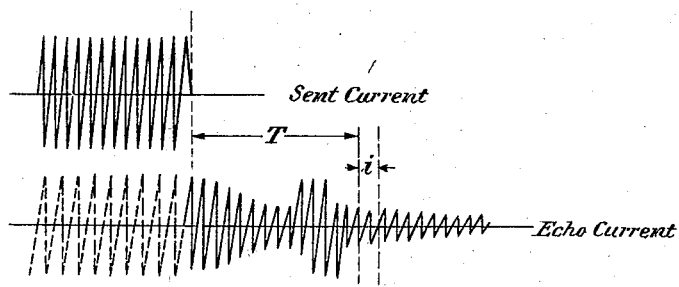
Figure 3:
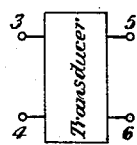
Figure 4:
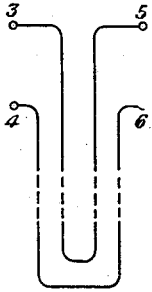
Figure 5:
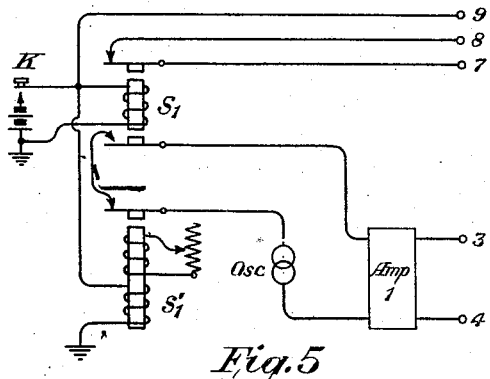

Referring to the drawings, Figure 1 is a diagram of apparatus that may be employed in the practice of my invention; Fig. 2 is a curve diagram illustrating the nature of an echo current and its relation to the principal current; and Figs. 3, 4 and 5 are fragmental diagrams illustrating modifications.

In the diagram of Fig. 1, the parts are indicated and labeled symbolically so that their structural relation will be readily apparent without explanation, and I will proceed at once to describe the use of the apparatus shown in Fig. 1 in the practice of my invention.

With the key K in its normally open position, the adjustable oscillator marked Osc. sends its output through the amplifier 1 to the winding between the points 3 and 4 of the hybrid coil H.

Upon closure of the key K and consequent operation of the relay $S_1$, the oscillator output circuit is immediately opened; this occurs at the beginning of the time period T in the wave representation for " sent current " in Fig. 2.

The echo current on the line, whatever it may be, produces its inductive effect in the winding between the points 5 and 6 and is amplified in amplifier 2 and goes to the adjustable network marked "Attenuator."

This echo current is represented in Fig. 2 by the solid line diagram of waves of varying amplitude, and the object of the system now being described is to measure and determine the envelope of this echo current as represented in Fig. 2. Briefly stated, the procedure consists in waiting for a period of time T, as indicated in Fig. 2, and then measuring the amplitude of the echo current for a brief interval of time $i$. The duration of the period of time T is varied by adjustment, and accordingly the varying amplitude of the echo current is determined for the whole duration of time that is essentially involved.

Normally the output from the attenuator is short-circuited through the front contact of the normally operated relay $S_2$, but when the key K was closed and the relay $S_1$ is operated, this opens at $S_1$ the energizing circuit of the relay $S_2$. At once the adjustable condenser $C_1$ begins to charge through the resistance $R_1$ so that a definite period of time elapses until the relay $S_2$ releases. This is the time T whose duration is determined by adjustment of the capacity of the condenser $C_1$.

When, at the end of the time period T the relay $S_2$ releases, this effectively connects the output circuit of the attenuator through the band pass filter BPF to the input of the detector Det. The output current from the detector operates the relay $S_4$, which causes the signal lamp I to light up; also the relay $S_4$ locks itself by a circuit through the key K as long as the key K is held closed.

Also, when the relay $S_2$ releases, it closes a circuit through the relay $S_3$ which, in turn, closes a locking circuit for itself and a pickup for relay $S_2$. The relay $S_3$ is made adjustably slow acting so that the time interval for which the relay $S_2$ remains released can be adjusted thereby. Thus the brief time interval $i$ is determined, beginning with the release of its armature by relay $S_2$ and ending with the re-energization of the relay $S_2$ through the closure of its pick-up circuit by the relay $S_3$. The locking circuit for $S_3$, which at the same time serves as a pick-up circuit for $S_2$, is completed through the key K and remains closed as long as the key K is held down.

The key K is operated repeatedly, and while this is being done, the attenuator is adjusted until the loss therethrough is so great that the output current from the detector Det. is barely sufficient to operate the relay $S_4$ and flash the lamp I. Each closure of the key K should be for a longer period than the period of time T. The attenuator is calibrated and its reading at this adjustment gives the amplitude of the current during the brief interval $i$.

Next the adjustment of the condenser $C_1$ is changed, and by means of the calibrations thereon this gives a new value and a corresponding reading for the time T. Then the key K is operated again repeatedly while the attenuator is brought to the proper adjustment, and from its calibration the value of the amplitude of the echo current is determined, corresponding to the new value of the time period T.

Thus by varying the adjustment for T over the whole essential range of time, the amplitude of the echo current can be plotted for this range of time, giving the envelope of the curve shown on the lower line in Fig. 2.

It will be seen that the duration of the short interval $i$ is determined by adjustment of the slow action for the relay $S_3$.

The foregoing sequence of operations has been with an assumed fixed adjustment of frequency for the oscillator Osc. The frequency of this oscillator can be adjusted to various desired values and the plot of echo current can be obtained for each such value as described above. The band pass filter BPF is of advantage when there is noise on the line, because it restricts the received current to approximately the frequency of the oscillator and thus cuts out substantially all of the noise. When there is no noise this band pass filter may be omitted.

The term "transducer" is employed in this specification in its usual sense to mean any piece of electrical apparatus with a set of input terminals for applied electromotive force and a set of output terminals for delivered current. Thus the hybrid coil H in Fig. 1, with the associated echo line and network N, all constitute a transducer with input terminals 3, 4 and output terminals 5, 6. In a sense the echo current on the line in this case may be looked upon as a delayed current in this transducer as a whole, and in general my system may be employed for measuring delayed current effects in transducers. This aspect of the invention is indicated in Fig. 3, where any transducer is indicated symbolically by the box lying between the pair of input terminals 3, 4 and the pair of output terminals 5, 6.

More particularly, this transducer may consist of a looped circuit as indicated in Fig. 4, and in this case the use of my system serves to measure the transient effect in this circuit.

For some purposes, in the study of transient effects, it may be desirable to send into the transducer, not a sustained current subject to be stopped abruptly, as represented in Fig. 2, but a mere short squirt of tone of definite limited duration. For this purpose the relay $S_1$ will be replaced by the combination shown in Fig. 5. That is, the apparatus at the left of the points 3, 4, 7, 8 and 9 in Fig. 1 will be cut off and replaced by the apparatus in Fig. 5. Modified in this way, it will be seen that the oscillator circuit is normally open instead of closed. When the key K is closed, at once the relay $S_1$ closes the oscillator circuit and puts current into the transducer. But after a period of time determined by adjustment of the slow acting relay $S_1'$, this latter relay opens the circuit of the oscillator; from this point of time, the operation proceeds the same as for Fig. 1 after the point of time when the period T begins. On releasing the key K, the relay $S_1$ of Fig. 5 releases before $S_1'$, which prevents the transmission of a squirt of current when the relays return to normal.

I claim:

1. Apparatus for measuring a delayed current effect through a transducer, consisting of an oscillator connected with the transducer input, said oscillator being adjustable as to frequency, an adjustable loss network connected with the output of said transducer, a detector adapted to be connected with the said network, a manual key to cut off the oscillator, and adjustable time period means adapted to have its action initiated thereby and after a certain period to connect the said detector with the said loss network.

2. Apparatus for measuring a delayed current effect through a transducer, consisting of means to apply a standard current to the transducer input, a manual key to cut off such current, adjustable time measuring means whose operation is initiated at such cut-off, and means actuated thereby after a definite measured lapse of time to measure the output current from the transducer.

3. In combination, a transducer, an oscillator connected therewith on its input side, an adjustable loss network connected therewith on its output side, a detector adapted to be connected to said network, a relay, a circuit for said relay, an adjustable delay device associated with said circuit, a manual key to disconnect the oscillator and close the circuit of said relay subject to said delay device, and means actuated by the relay to connect the said detector with the said network.

4. In combination, a transducer, an oscillator adapted to be connected therewith on its input side, an adjustable loss network connected therewith on its output side, a current indicator adapted to be connected to said network, two relays $S_2$ and $S_3$, a circuit for $S_2$, adjustable delay means associated with said circuit, a manual key to cut off the oscillator and to establish a circuit for $S_2$ subject to delay, means actuated by $S_2$ to connect the said indicator with the said network and at the same time to energize $S_3$, slow-acting means associated with $S_3$, and means controlled by $S_3$ to cut off said indicator.

In testimony whereof, I have signed my name to this specification this 13th day of February, 1929.

HAROLD C. SILENT.